March 27, 1934. A. BECHLER 1,952,966
AUTOMATIC LATHE WITH AUTOMATICALLY SLIDABLE HEADSTOCK
Filed Dec. 2, 1932
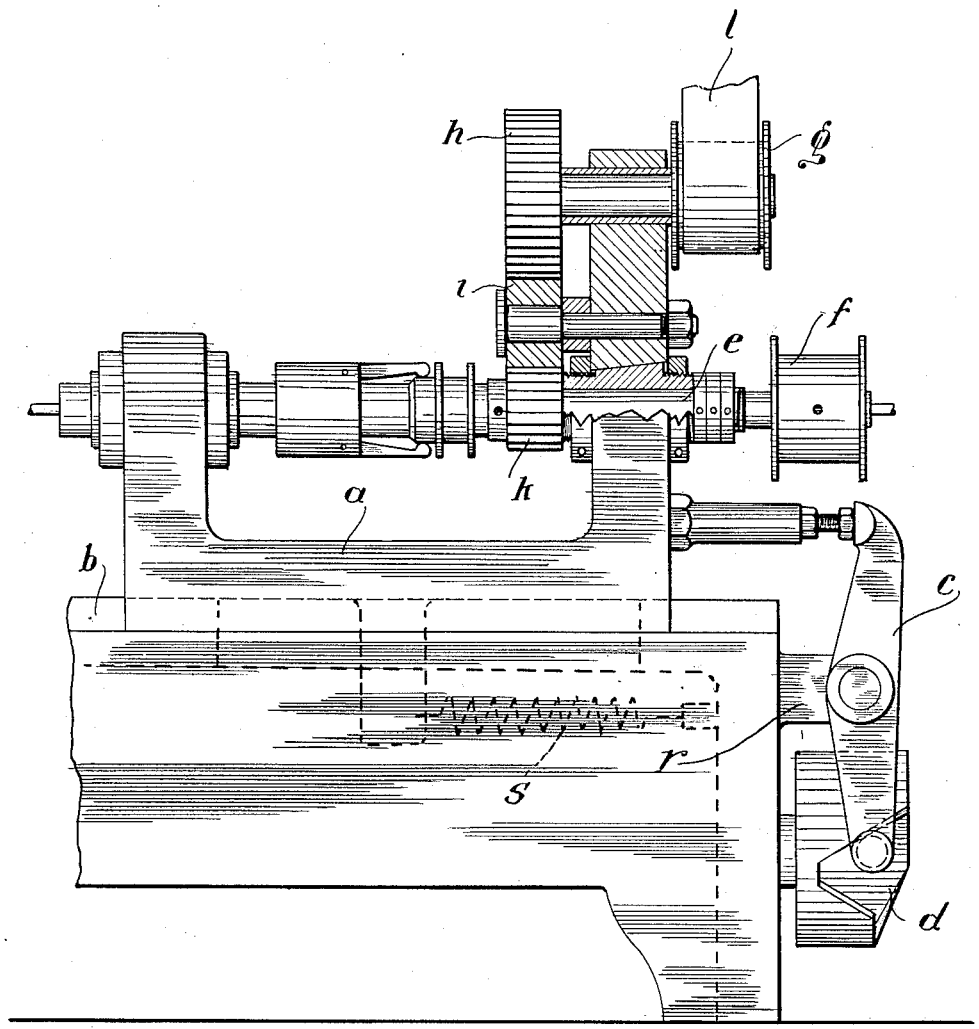
Inventor:
André Bechler
By [signature]
Attorney Patented Mar. 27, 1934

1,952,966

UNITED STATES PATENT OFFICE 1,952,966

AUTOMATIC LATHE WITH AUTOMATICALLY SLIDABLE HEADSTOCK

André Bechler, Moutier, Switzerland

Application December 2, 1932, Serial No. 645,486
In Switzerland December 24, 1931

1 Claim. (Cl. 29—52)

The present invention relates to automatic lathes having automatically slidable head stocks.

For certain work which has to be done on such lathes very much increased speeds are required than those hitherto employed. Until at present step pulleys were used for obtaining such speeds, but then all the annoyance connected with such high speed belts and very well well known by the people of the trade had also to be taken into the account.

It is the object of the present invention to impart to the spindle an elevated speed without elevating the speed of the belt. The invention consists therefore in a device inserted between driving pulley and spindle and adapted to increase the rate of speed received from the driving pulley.

The invention is shown by way of example and diagrammatically in the accompany drawing.

The headstock $a$ is slidably arranged on the bed $b$ of the lathe and adapted to be rocked to and fro thereon under the effect of a pivoted lever $c$ moved by a cup-shaped cam $d$ and of a counteracting helical spring $s$ attached to the bed $b$ and to the headstock $a$. The pivoted lever is supported by a bracket $r$ fast to the bed, while the cam $d$ is rotatably mounted in the base of the lathe. The driving of the spindle $e$ is obtained in two ways. First without increasing the speed of the spindle by means of a belt pulley $f$ provided on the spindle itself and in the second place from a belt pulley $g$ on a shaft mounted on an elevated portion $t$ of the head stock and driving the spindle through a train of spur wheels $h, i, k$. In this manner the speed of the spindle may be increased without changing the speed of the belt $l$.

Here the transmission of power from the pulley $g$ to the spindle $e$ is obtained by means of spur wheels, but the power could also be transmitted by means of any other suitable means.

In machines with one single driving pulley where the counter shaft is located in the underframe of the machine, it is preferred to have the runs of the belt passing on both sides of the spindle. Then the intermediate spur wheels will be arranged so as to have the axis of the driving pulley in the same vertical plane with the axis of the spindle.

If the belt is put on the pulley $f$ the obtained maximum speed will do for steel and the like, but for brass the speed of the main spindle will have to be increased which can be done by putting the belt on the pulley $l$.

What I claim as new:

In an automatic high speed lathe having an automatically sliding headstock and in combination, a lathe bed, a headstock fitted slidably to said lathe bed, a helical spring attached to the frame of the lathe and to the headstock, a cup-shaped cam rotatably mounted in the base of the lathe and a lever pivotally supported by the frame of the lathe and held by said cam in operative contact with said headstock, a main spindle journalled to said headstock, a spur wheel mounted on this spindle and a pulley adapted to receive the highest possible speed, an auxiliary spindle journalled to an elevated portion of the headstock, a spur wheel of larger size than the first mounted thereon and a pulley of like size as the former adapted to receive in change the same belt as the main spindle pulley and an intermediate spur wheel meshing with the two spurs aforesaid and adapted to turn the two spindles in the same sense.

ANDRE BECHLER.